US006637824B1

United States Patent
Yokota

(10) Patent No.: US 6,637,824 B1
(45) Date of Patent: Oct. 28, 2003

(54) ARRANGEMENT FOR SECURING SUPPORT SPRINGS IN VEHICLE SEAT FRAME

(75) Inventor: Masaaki Yokota, Akishima (JP)

(73) Assignee: Tachi-S Co., Ltd., Tokyo (JP)

( * ) Notice: Subject to any disclaimer, the term of this patent is extended or adjusted under 35 U.S.C. 154(b) by 0 days.

(21) Appl. No.: 10/157,234

(22) Filed: May 30, 2002

(51) Int. Cl.[7] .............................................. A47C 7/35
(52) U.S. Cl. ......................... 297/452.18; 297/452.2; 297/452.52
(58) Field of Search ..................... 297/452.18, 452.2, 297/452.52

(56) References Cited

U.S. PATENT DOCUMENTS

| | | | |
|---|---|---|---|
| 5,409,198 A | | 4/1995 | Roick |
| 6,409,262 B1 | * | 6/2002 | LaPointe ..................... 297/68 |
| 6,499,806 B2 | * | 12/2002 | Nagayasu et al. ........ 297/452.2 |
| 6,499,807 B1 | * | 12/2002 | Kaneda et al. ......... 297/452.52 |

FOREIGN PATENT DOCUMENTS

JP          6-44455 U          6/1994

* cited by examiner

Primary Examiner—Anthony D. Barfield
(74) Attorney, Agent, or Firm—Browdy and Neimark, P.L.L.C.

(57) ABSTRACT

An arrangement for securing springs in a vehicle seat frame, which comprises holes formed in the vehicle seat frame and anchor members. The anchor members are each formed by a plate spring comprising a generally "U" shaped body portion and a pair of flange portions, with a whole of such metallic plate spring being coated with a synthetic resin material. Each of the anchor members is fitted in each of the holes, and each of the support springs is engaged with the generally "U" shaped body portion of each of the anchor members, whereby the support springs are secured in the vehicle seat frame. In this arrangement, a through-hole may be formed in that anchor member's "U" shaped body portion, so that other support springs of different modes may each be engaged in such through-hole, instead of being engaged with the "U" shaped body portion.

6 Claims, 3 Drawing Sheets

US 6,637,824 B1

ARRANGEMENT FOR SECURING SUPPORT SPRINGS IN VEHICLE SEAT FRAME

BACKGROUND OF THE INVENTION

1. Field of the Invention

The present invention relates to support springs which are extended in a seat frame of vehicle seat for resiliently supporting a formed padding and a body of passenger. In particular, the invention is directed to an arrangement for anchoring or securing such support springs in the vehicle seat frame.

2. Description of Prior Art

Normally, in many of vehicle seats, a plurality of sinuous support springs are securely extended in the seat frame and a foamed cushion member is placed on those springs for the purpose of providing an improved cushiony comfortable support to a seat occupant or a passenger.

Typical, in most cases, the support springs of this kind are each engaged, at its end, with a corresponding one of a plurality of securing clamps welded to the seat frame. But, since both springs and clamps are formed from a hard metallic material, an unpleasant noise is inevitably generated from a keen contact among the springs and clamps.

Hitherto, many attempts have been made to solve such noise problem. For example, a suitable material for noise reduction is attached to each of the ends of springs during assembly of a seat frame, in order to eliminate a keen contact and resulting noise between each end of support spring and each clamp. However, attaching such noise reduction material to each end of spring is quite troublesome and time-consuming. In view of this shortcoming, the Japanese Laid-Open Utility Model Publication No. 6-44455 discloses a plurality of generally U-shaped anchor members which are each formed from a synthetic resin material effective for noise reduction, and further discloses a seat frame having a plurality of securing holes formed therein. According thereto, each end of support spring is anchored in each of such generally U-shaped anchor members, thereby not only preventing generation of noise therefrom, but also making it easy to extend the support springs in the seat frame.

But, such anchor member itself disclosed in the Japanese Pub. No. 6-44455 is insufficient in rigidity due to the nature of synthetic resin material and may be susceptible to deformation and breakage.

SUMMARY OF THE INVENTION

In view of the above drawbacks, it is therefore a primary purpose of the present invention to provide an improved arrangement for securing a support spring to a vehicle seat frame, which has a predetermined rigidity and noise reduction effect.

In order to achieve such purpose, in accordance with the present invention, an arrangement for securing a support spring to a vehicle set frame is basically comprised of:

hole means defined in the vehicle seat frame; and anchor means formed from a metallic plate spring, which includes: a generally "U" shaped body portion with which the support spring means is to be engaged; and a pair of flange portions extending outwardly from the generally "U" body portion in a direction opposite to each other;

wherein the "U" shaped body portion and the pair of flange portions are formed integrally together from a plate spring and coated with a synthetic resin material; wherein the anchor means is secured in said hole means such that the generally "U" shaped body portion thereof is frictionally fitted in the hole means, while the pair of flange portions thereof are contacted with the vehicle seat frame, and wherein the support spring means is engaged with the generally "U" shaped body portion of the anchor means and thereby secured in the vehicle seat frame.

Accordingly, the anchor means, by the reason that it is formed from a metallic plate spring and coated with the synthetic resin material, is not only rigid against deformation, but also prevents a noise from being generated due to a contact between the anchor means and the hole means.

It is a second purpose of the present invention to allow a spring means to be engaged with another portion of the anchor means, in addition to the generally "U" shaped portion of the anchor means.

For that purpose, a through-hole may be formed in the generally "U" shaped body of the anchor means, thereby allowing the anchor means to be engaged in such through-hole. Thus, two different modes of spring means may be engaged with the anchor means.

Other various features and advantages will become apparent from the descriptions hereinafter, with reference to the annexed drawings.

DETAILED DESCRIPTION OF PREFERRED EMBODIMENT OF THE INVENTION

Referring to FIGS. 1 through 6, there is illustrated a preferred embodiment of arrangement for securing support springs in a seat frame of vehicle seat.

Figure 1:
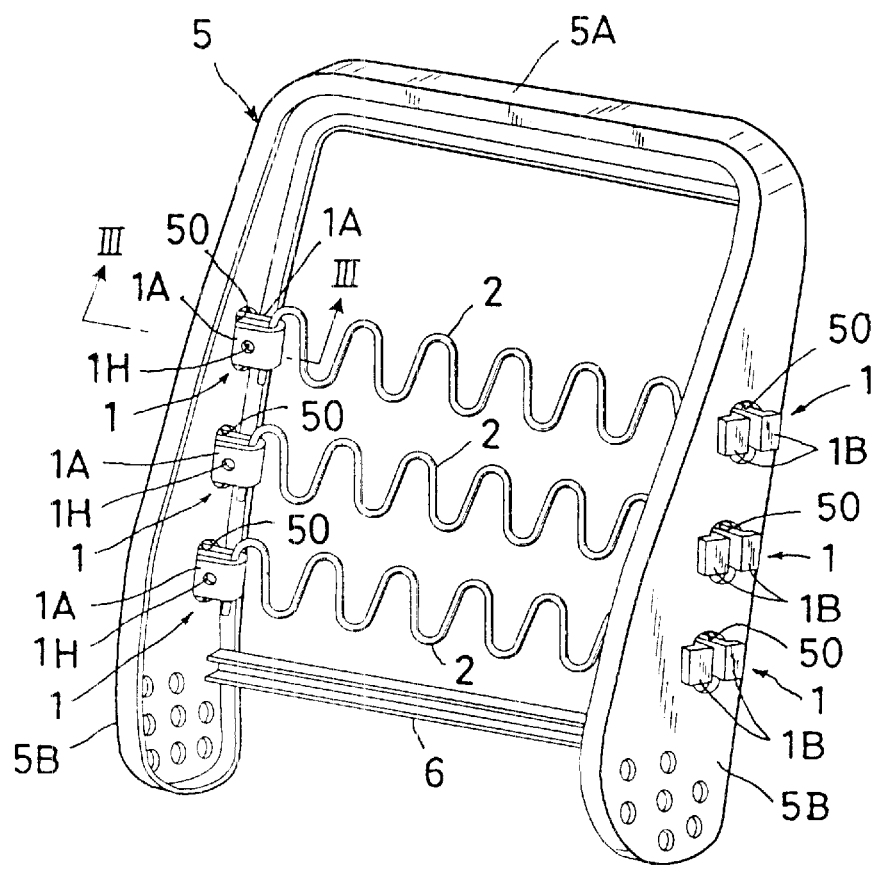
FIG. 1 is a perspective view of a vehicle seat back frame to which an arrangement for securing support springs thereto is applied in accordance with the present invention in the case where a plurality of sinuous springs are used in the vehicle seat back frame.

Designation (5) in FIG. 1 represents a seat back frame to be provided within a seat back of a vehicle seat (not shown). As is known, the seat back frame (5) is formed in a generally inverted-U-shaped configuration comprising: a pair of vertical frame sections (5B) (5B); a horizontal upper frame section (5A) defined between the two vertical frame sections (5B); and a reinforcing lower cross frame (6) connected between the two lower end portions respectively the two vertical fame sections (5B).

Figure 3:
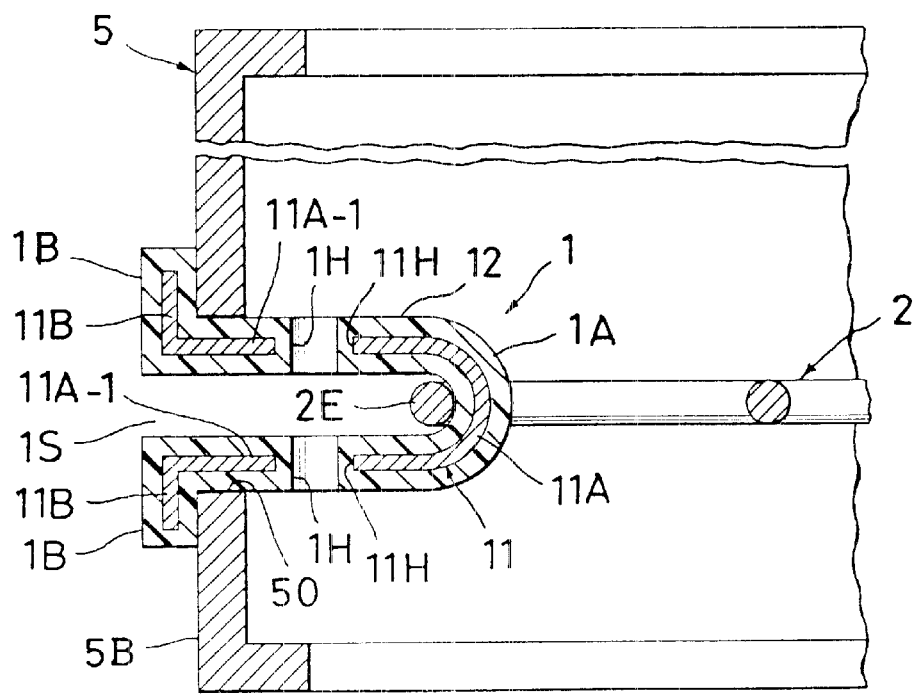
FIG. 3 is a fragmentary sectional view taken along the line III—III in FIG. 1.
Figure 4:
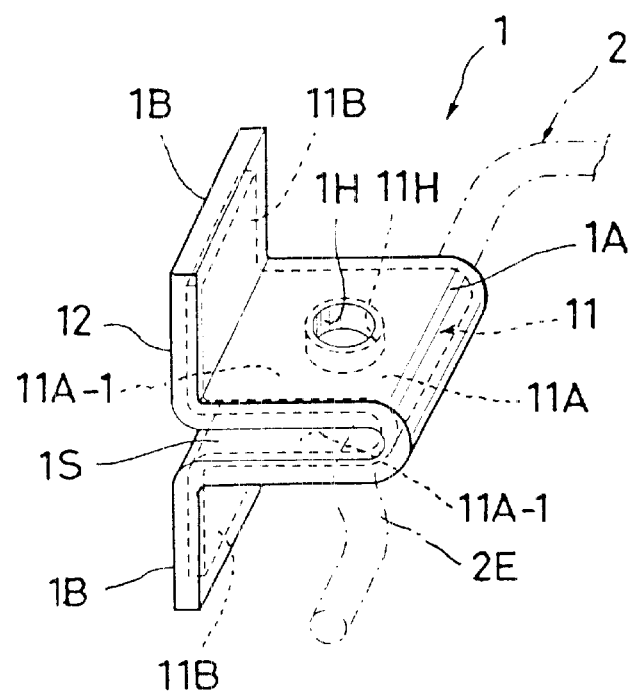
FIG. 4 is a schematic view of a anchor member forming a principal part of the invention.

In accordance with the present invention, a plurality of elongated securing holes (50) are formed in each of the two lateral frame sections (5B). In the shown embodiment, three elongated securing holes (50) are formed in each of them in an equidistant manner. Also, according to the present invention, there are provided a plurality of anchor members (1). In the shown embodiment, total six anchor members (1) are provided, each of which is so formed as to have a generally "U" shaped main body (1A) and a pair of flange portions (1B) (1B) extending horizontally from that main body (1A) in a direction opposite to each other. As best depicted in FIGS. 3 and 4, the anchor member (1) comprises a metallic core body (11) which is formed by bending a metallic plate spring into the illustrated generally "T" shaped configuration. Specifically, the metallic core body of such generally "T" shaped anchor member (1) is formed by: a generally "U" shaped core portion (11A) having a curved end core portion (11A-2) and a pair of lateral core body sections (11A-1) (11A-1); and a pair of flange core portions (1B) (1B) extending form the respective two lateral core body sections (11A-1) (11A-1) at a right angle in a direction opposite to each other. Thus, due to the rigid yet elastic property of the plate spring, the two lateral core body sections (11A-1) are resiliently bendable in a direction to and away from each other relative to the curved end core portion (11A-2).

In addition, a whole of such generally "T" shaped core body (11) of anchor member (1) is coated with a synthetic resin layer (12), as seen from both FIGS. 3 and 4.

Accordingly, the thus-coated anchor member (1) is of a generally "T" shaped body comprising: a "U" shaped body portion (1A); a pair of through-holes (1H) (1H) which are respectively formed in the two lateral sections (at 11A-1 and 11A-1) of the "U" shaped body portion (1A); and a pair of flange portions (1B) (1B) extending outwardly from those two lateral sections of the "U" shaped body portion (1A), respectively.

As shown, defined between the two lateral sections (at 11A-1) is a slit region (1S) adapted to receive and connect an end of support spring therewith as will be described later. Further, formed respectively in the two lateral body sections (at 11A-1) are a pair of connecting through-holes (11H) (11H) adapted to allow an end of another different support spring to be inserted therein, as will also be described later.

Figure 2:
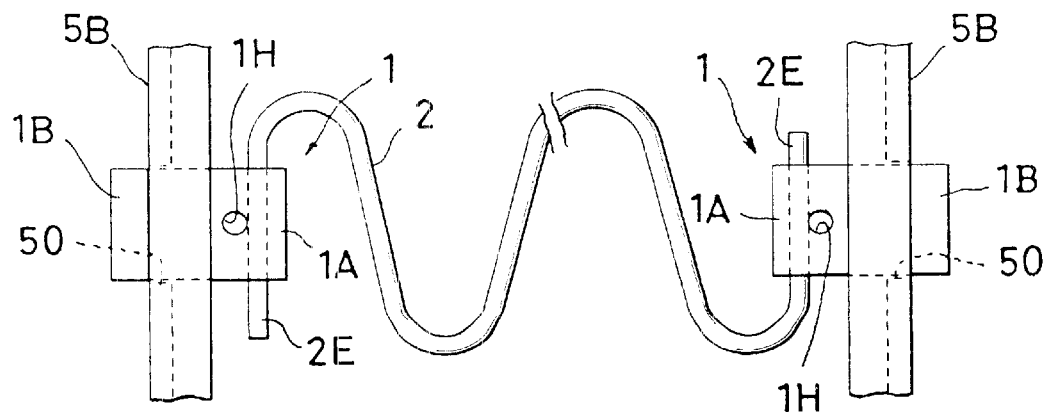
FIG. 2 is a fragmentary front view showing a principal part of the arrangement in accordance with the invention.

Reference is now made to one embodiment shown in FIGS. 1 to 3, wherein, by way of example, three sinuous support springs (2) are used in the seat back frame (5). As shown in FIG. 1, three securing holes (50) are formed in each of the two lateral frame sections (5B) of the seat back frame (5), thus providing six securing holes (50). Thus, total six anchor members (1) are provided in this instance and they are each inserted in the respective six securing holes (50), as in FIG. 1. In this respect, it is noted that the width of the "U" shaped body portion (1A) of each anchor member (1) is slightly greater than the width of each securing hole (50). As such, in assembly, both two flange portions (1B) can be pressed inwardly, as by worker's fingers or a robot arm, toward each other, so as to narrow the width of the anchor member's U-shaped body portion (1A), and then, that body portion 1 (A) is inserted in the corresponding securing hole (50) so that the two flange portions (1B) contact the outer surface of the lateral frame section (5B) surrounding the hole (50). Then, upon releasing both flange portions (1B) from such pressed state, the anchor member (1) automatically tends to widen its width and biasingly causes both two sides of its U-shaped body portion (1A) to frictionally contact the edges of securing holes (50). Accordingly, the anchor member (1) itself is positively retained in the securing hole (50) against removal therefrom due to such biased frictional contact with the edges of securing hole (50).

Thereafter, as understandable from FIGS. 2 and 3, one hook-like end portion (2E) of the sinuous support spring (2) is inserted and engaged in the slit region (see (1S) in FIG. 3) of one anchor member (1) secured in the right lateral frame section (5B), while another opposite hook-like end portion (2E) thereof is inserted and engaged in the slit region (see (1S) in FIG. 3) of another anchor member (1) secured in the left lateral frame section (5B), whereupon the sinuous support spring (2) is securely connected, via the two anchor members (1), between the right and left lateral frame sections (5B) of seat back frame (5). In that way, all remaining two sinuous support springs (2) are likewise connected, via their corresponding two anchor members (1), between the two seat back frame lateral sections (5B), as in FIG. 1.

Of course, the above-described arrangement is not limited to the illustrated seat back frame (5), but may be applied to a seat cushion frame (not shown) to be provided within a seat cushion of vehicle seat on which the buttocks portion of passenger is to be supported.

Figure 5:
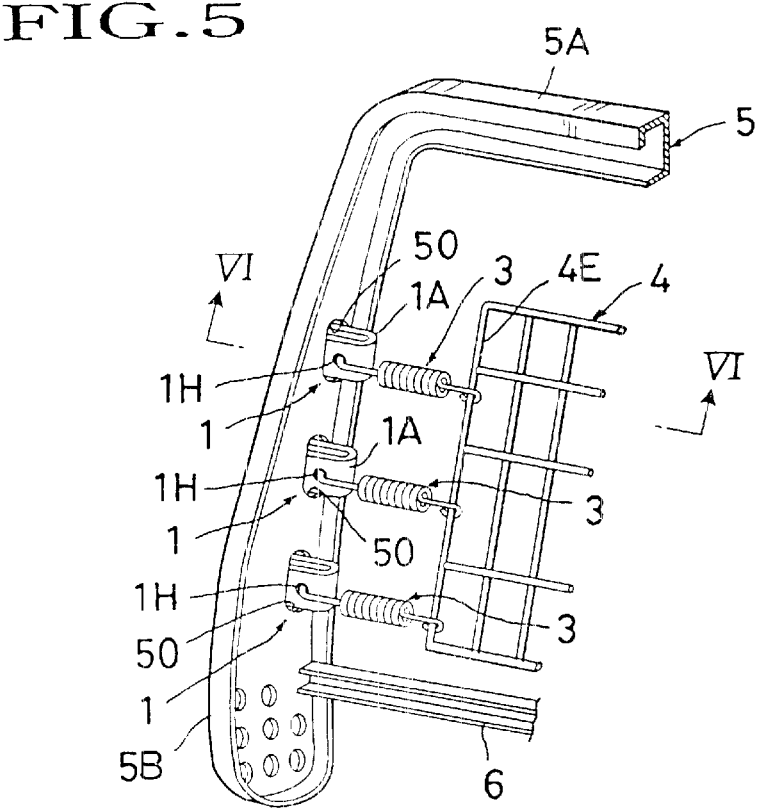
FIG. 5 is a partly broken perspective view of a vehicle seat back frame to which the arrangement of the present invention is applied in the case where coil springs and planar gird support member are used in the vehicle seta back frame.
Figure 6:
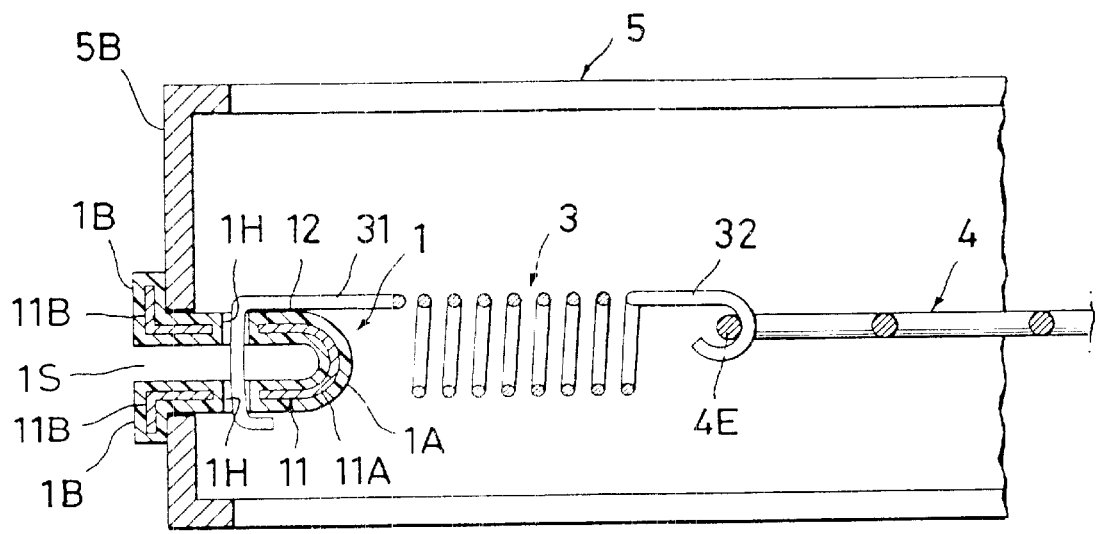
FIG. 6 is a fragmentary sectional view taken along the line VI—VI in FIG. 5.

Reference is made to FIGS. 5 and 6 which shows the case where a planar support means or a planar grid support member (4) is used in the seat back frame (5), which is well-known support arrangement for stably and fully supporting a foamed padding (not shown) of seat back as well as the back of passenger leaning thereagainst. While shown fragmentarily, the planar grid support member (4) itself is provided with an elastic cushiony property and formed in a generally rectangular shape to support the foamed padding (not shown) as well known in the art. Therefore, it is to be seen that a plurality of coil-type connection springs (3) are used to connect the grid support member (4) with both two lateral frame sections (5B) of seat back frame (5). Each connection spring (3) has a pair of first and second end portions (31) (32), as best shown in FIG. 6. In ordinary, as in FIG. 5, three connection springs (3) have been, at their respective second end portions (32), securely attached over one outermost lateral wire portion (4E) of the planar grid support member (4) in advance. Though not shown, another three connection springs (3) have been, at their respective second end portions (32), securely attached over another opposite outer most lateral wire portion (not shown) of the planar grid support member (4) in advance, as understandable from both FIGS. 1 and 5.

In this particular mode, as similar to the foregoing first mode shown in FIG. 1, three anchor members (1) are secured in the respective three securing holes (50) of each of the two lateral frame sections (5B) of seat back frame (5). Then, the planar grid support member (4) with three connection springs (3) attached on each of the two outermost lateral wire portions (4E) thereof are brought to the seat back frame (5). And, the first end portion (32) of each connection spring (3) is inserted through both two through-holes (1H) of each anchor member (1) and securely engaged therein, whereupon the planar support member (4) is resiliently supported centrally of the seat back frame (5) via total six connection springs (3).

With the arrangements described above, it is appreciated that, the present invention has the following effects and advantages:

(i) The anchor member (1), by the reason that its core body (11) is a metallic plate spring, is rigid against deformation and also provided with an elastic repercussive property which tends to biasingly cause both two sides of its U-shaped body portion (1A) to frictionally contact the edges of securing holes (50). Thus, the anchor member (1) itself can be positively retained in the securing hole (50) against removal therefrom.

(ii) The anchor member (1), as secured in a vertically extending lateral frame section (5B), is not only provided with a connecting slit region (1S) which defines a vertically extending opening, but also formed with two through-holes (1H) which defines a horizontally extending opening in a direction intersecting or diagonal with such vertically extending opening (1S). Therefore, an ordinary sinuous support spring (2) can be securely engaged, at its vertically extending end portion (2E), in such vertically extending opening defined in the slit region (1S). Also, a particular connection spring (3) or the like can be securely engaged, at its horizontally extending end portion (31), in such horizontally extending opening defined by the two through-holes (1H).

(iii) Further, a whole of the core body (11) is coated with a synthetic resin layer (12) to form the anchor member (1). This effectively prevents generation of noise at a point where the spring end portion (i.e. 2E or 31) is contacted with the corresponding portion (i.e. 1S or 1H) of anchor member (1).

Finally, it should be understood that the present invention is not limited to the illustrated embodiments, but any other modification, replacement and addition may be applied thereto without departing from the scopes of the appended claims.

What is claimed is:

1. A spring means securing arrangement in combination with a vehicle seat frame for securing a spring means to the vehicle seat frame comprising:

hole means defined in said vehicle seat frame;

anchor means including: a generally "U" shaped body portion with which said spring means is to be engaged; and a pair of flange portions extending outwardly from said generally "U" body portion in a direction opposite to each other; and said "U" shaped body portion and said pair of flange portions being formed integrally together from a plate spring and coated with a synthetic resin material;

wherein said anchor means is secured in said hole means such that the generally "U" shaped body portion thereof is frictionally fitted in the hole means, while the pair of flange portions thereof are contacted with said vehicle seat frame, and wherein said support spring means is engaged with the generally "U" shaped body portion of the anchor means and thereby secured in said vehicle seat frame.

2. The arrangement as defined in claim 1, wherein said vehicle seat frame has a pair of spaced-apart lateral frame sections, wherein said hole means comprises a plurality of through-holes formed in each of said pair of spaced-apart lateral frame sections, wherein said anchor means comprises a plurality of anchor members each having said generally "U" shaped body portion and said pair of flange portions, wherein said spring means comprises a plurality of support springs each having a pair of end portions, wherein each of said plurality of anchor members is secured in each of said plurality of through-holes, such that the generally "U" shaped body portion thereof projects inwardly of said pair of spaced-apart lateral frame sections, while the pair of flange portions thereof are contacted with said each of said pair of spaced-apart lateral frame, and wherein each of said pair of end portions of each of said plurality of support springs is engaged with said generally "U" shaped body portion of each of said plurality of anchor members, whereby said plurality of support springs are securely connected between said pair of spaced-apart lateral frame sections of said vehicle seat frame.

3. A spring means securing arrangement in combination with a vehicle seat frame for securing a spring means to the vehicle seat frame comprising:

hole means defined in said seat frame;

anchor means including: a generally "U" shaped body portion with which said spring means is to be engaged, said generally "U" shaped body including a pair of spaced-apart lateral body portions and a pair of flange portions extending outwardly from the respective said pair of spaced-apart lateral body portions in a direction opposite to each other;

said generally "U" shaped body portion and said pair of flange portions being formed integrally together from a plate spring and coated with a synthetic resin material; and a pair of through-hole formed respectively in said pair of lateral body portions of said generally "U" shaped body portion associated with said anchor means, wherein said anchor means is secured in said hole means such that the generally "U" shaped body portion thereof is, at the pair of spaced-apart body portions thereof, frictionally fitted in the hole means, while the pair of flange portions thereof are contacted with said vehicle seat frame, and wherein said spring means is engaged in said pair of through-hole associated with said generally "U" shaped body portion of the anchor means and thereby secured in said vehicle seat frame.

4. The arrangement as defined in claim 3, wherein said generally "U" shaped body has a pair of spaced-apart lateral portions which define a slit region therebetween, said slit region extending in one direction, and wherein said pair of through-holes are defined in a coaxial relation with each other to provide a through-hole passage extending in another direction to intersect said one direction in which said slit region extends.

5. The arrangement as defined in claim 3, wherein said vehicle seat frame has a pair of spaced-apart lateral frame sections, wherein said hole means comprises a plurality of holes formed in each of said pair of spaced-apart lateral frame sections, wherein said spring means comprises a plurality of support springs each having a pair of end portions, wherein said anchor means comprises a plurality of anchor members each having said generally "U" shaped body portion and said pair of flange portions, wherein each of said plurality of anchor members is secured in each of said plurality of holes, such that the generally "U" shaped body portion thereof projects inwardly of said pair of spaced-apart lateral frame sections, while the pair of flange portions thereof are contacted with said each of said pair of spaced-apart lateral frame, and wherein each of said pair of end portions of each of said plurality of support springs is engaged with said generally "U" shaped body portion of each of said plurality of anchor members, whereby said plurality of support springs are securely connected between said pair of spaced-apart lateral frame sections of said vehicle seat frame.

6. The arrangement as defined in claim 3, wherein said vehicle seat frame has a pair of spaced-apart lateral frame sections, wherein said hole means comprises a plurality of holes formed in each of said pair of spaced-apart lateral frame sections, wherein a planar support means is provided, wherein said spring means comprises a plurality of springs each having a first end portion and a second end portion engaged with said planar support means, wherein said anchor means comprises a plurality of anchor members each having said generally "U" shaped body portion and said pair of flange portions, wherein each of said plurality of anchor members is secured in each of said plurality of holes, such that the generally "U" shaped body portion thereof projects inwardly of said pair of spaced-apart lateral frame sections, while the pair of flange portions thereof are contacted with said each of said pair of spaced-apart lateral frame, and wherein said first end portion of each of said plurality of support springs is securely engaged in said pair of through-holes associated with each of said plurality of anchor members, whereby both said plurality of springs and said planar support means are securely connected between said pair of spaced-apart lateral frame sections of said seat frame.

* * * * *